(12) United States Patent
Hsu et al.

(10) Patent No.: US 12,344,109 B2
(45) Date of Patent: Jul. 1, 2025

(54) LIQUID-COOLED CHARGING EQUIPMENT WITH MULTIPLE CHARGING CONNECTOR ASSEMBLIES AND METHOD OF OPERATING THE SAME

(71) Applicant: DELTA ELECTRONICS, INC., Taoyuan (TW)

(72) Inventors: Jui-Yuan Hsu, Taoyuan (TW); Ming-Hsien Hsieh, Taoyuan (TW); Kai-Hung Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 882 days.

(21) Appl. No.: 17/519,964

(22) Filed: Nov. 5, 2021

(65) Prior Publication Data
US 2022/0219555 A1    Jul. 14, 2022

(30) Foreign Application Priority Data
Jan. 14, 2021    (CN) .......................... 202110050323.1

(51) Int. Cl.
*B60L 53/302*    (2019.01)
*B60L 53/16*    (2019.01)

(52) U.S. Cl.
CPC .............. *B60L 53/302* (2019.02); *B60L 53/16* (2019.02)

(58) Field of Classification Search
CPC ............................... B60L 53/302; B60L 53/16
(Continued)

(56) References Cited

U.S. PATENT DOCUMENTS

2009/0229288 A1*    9/2009    Alston ............... B60H 1/00428
                                                    62/239
2015/0054460 A1*    2/2015    Epstein ................... B60L 58/27
                                                    320/109
(Continued)

FOREIGN PATENT DOCUMENTS

CN        107933340 A        4/2018
CN        109703403 A        5/2019
(Continued)

OTHER PUBLICATIONS

Office Action dated Feb. 14, 2025 of the corresponding CN patent application No. 202110050323.1, 11 pages.

*Primary Examiner* — Suresh Memula
(74) *Attorney, Agent, or Firm* — MUNCY, GEISSLER, OLDS & LOWE, P.C.

(57) ABSTRACT

A liquid-cooled charging equipment with multiple charging connector assemblies includes a recirculating cooling apparatus, a plurality of charging connector assemblies, a plurality of coolant supply pipes, a plurality of coolant return pipes, a plurality of valves, and a control unit. The recirculating cooling apparatus has an outlet side and an inlet side. Each charging connector assembly includes a charging connector and a charging cable having an inlet end and an outlet end. Each valve is correspondingly disposed in each coolant supply pipe. The control unit is coupled to the valves and the charging connector assemblies. When the charging connector assemblies are in operation of charging, the control unit opens the valves corresponding to the charging connector assemblies to allow the low-temperature coolant provided by the recirculating cooling apparatus to flow through the coolant supply pipes to cool the charging connectors.

16 Claims, 6 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 2017/0088007 | A1* | 3/2017 | Melendez | B60L 53/302 |
| 2019/0241093 | A1* | 8/2019 | Shimauchi | H01M 10/6563 |
| 2020/0164718 | A1* | 5/2020 | Takei | B60L 3/0061 |
| 2020/0171965 | A1* | 6/2020 | Ko | H01M 10/613 |
| 2020/0343022 | A1* | 10/2020 | Tasiopoulos | B60L 53/18 |
| 2023/0130832 | A1* | 4/2023 | Dunn | H02J 7/0048 |
| | | | | 320/109 |
| 2023/0406070 | A1* | 12/2023 | Zheng | B60H 1/2218 |

FOREIGN PATENT DOCUMENTS

| | | | | |
|---|---|---|---|---|
| CN | 109743866 | A | 5/2019 | |
| CN | 211809131 | U | 10/2020 | |
| CN | 112092658 | A | 12/2020 | |
| DE | 102020204692 | A1 * | 8/2021 | |
| DE | 102020204695 | A1 * | 8/2021 | ............. B60L 53/12 |
| KR | 20110048772 | A * | 5/2011 | |
| WO | WO-2016054068 | A1 * | 4/2016 | ............... B60L 1/08 |
| WO | WO-2017182484 | A1 * | 10/2017 | ............... B60L 1/04 |

* cited by examiner

LIQUID-COOLED CHARGING EQUIPMENT WITH MULTIPLE CHARGING CONNECTOR ASSEMBLIES AND METHOD OF OPERATING THE SAME

BACKGROUND

Technical Field

The present disclosure relates to a charging equipment and a method of operating the same, and more particularly to a liquid-cooled charging equipment with multiple charging connector assemblies applied to electric vehicles and a method of operating the same.

Description of Related Art

The statements in this section merely provide background information related to the present disclosure and do not necessarily constitute prior art.

With the development of the electric vehicle (EV) industry, modern EVs are usually loaded with large-capacity rechargeable batteries in order to increase the travel distance after being charged. In response to this technological development trend, fast EV charging equipment is generally designed to provide a relatively large output power (for example, 50 kW to 350 kW) to quickly charge EVs to avoid long waiting time of charging for car owners. However, the larger output power may cause the charging cable to generate high heat due to the larger current during the charging process. Therefore, the fast EV charging equipment is usually equipped with a cooling device (for example, in a liquid-cooling manner) to dissipate the heat of the charging connector of the charging connector assembly through the cooling pipeline design.

For existing liquid-cooled high-power charging equipment with multiple charging connector assemblies, although it has a multiple charging connector assemblies design, all charging connector assemblies are usually designed to be connected to a common coolant supply pipe used to supply coolant. Therefore, as long as one of the charging connector assemblies is abnormal, the remaining charging connector assemblies will not be able to continue to operate due to the absence of the coolant supply when the system performs a protective action to close the valve of the aforementioned coolant supply pipes. As a result, the availability and reliability of traditional liquid-cooled high-power charging equipment with multiple charging connector assemblies are relatively poor.

Accordingly, the liquid-cooled charging equipment with multiple charging connector assemblies of the present disclosure is provided to determine whether the pipe has abnormal coolant leakage or whether the charging connector has abnormal overheating by using the pressure sensor, the flow sensor, and the temperature sensor, so that the relevant actions such as early warning, protection, and maintenance can be taken in time to increase the service life of charging connector assemblies and electric vehicles and ensure user safety. In addition, once one or some of the charging connector assemblies are disabled due to abnormal conditions, the rest normal charging connector assemblies can still continue to operate, which increases the availability and reliability of the liquid-cooled charging equipment.

SUMMARY

An object of the present disclosure is to provide a liquid-cooled charging equipment with multiple charging connector assemblies to solve the problems of the existing technology.

In order to achieve the above-mentioned object, the liquid-cooled charging equipment with multiple charging connector assemblies includes a recirculating cooling apparatus, a plurality of charging connector assemblies, a plurality of coolant supply pipes, a plurality of coolant return pipes, a plurality of valves, and a control unit. The recirculating cooling apparatus supplies a coolant, and has an outlet side and an inlet side. Each charging connector assembly includes a charging connector and a charging cable connected to the charging connector, and has an inlet end and an outlet end. A first end of each coolant supply pipe is connected to the outlet side, and a second end of each coolant supply pipe is correspondingly connected to the inlet end of each charging cable. A first end of each coolant return pipe is correspondingly connected to the outlet end of each charging cable, and a second end of each coolant return pipe is connected to the inlet side. Each valve is correspondingly disposed in each coolant supply pipe. The control unit is coupled to the valves and the charging connector assemblies. When at least one of the charging connector assemblies is in operation of charging, the control unit opens the valve corresponding to the charging connector assembly in operation.

Accordingly, the liquid-cooled charging equipment with multiple charging connector assemblies is provided to determine whether the pipe has abnormal coolant leakage or whether the charging connector has abnormal overheating by using the pressure sensor, the flow sensor, and the temperature sensor, so that the relevant actions such as early warning, protection, and maintenance can be taken in time to increase the service life of charging connector assemblies and electric vehicles and ensure user safety. In addition, once one or some of the charging connector assemblies are disabled due to abnormal conditions, the rest normal charging connector assemblies can still continue to operate, which increases the availability and reliability of the liquid-cooled charging equipment.

Another object of the present disclosure is to provide a method of operating a liquid-cooled charging equipment with multiple charging connector assemblies to solve the problems of the existing technology.

In order to achieve the above-mentioned object, the method of operating the liquid-cooled charging equipment with multiple charging connector assemblies includes steps of: opening, when at least one of the charging connector assemblies is in operation of charging, the valve corresponding to the charging connector assembly; measuring a first pressure value, a first temperature value, and a flow rate value of the coolant supply pipe connected by the charging connector assembly through which the coolant flows; measuring a second pressure value and a second temperature of the coolant return pipe connected by the charging connector assembly through which the coolant flows; determining if the coolant supply pipe is abnormal according to the first pressure value, the second pressure value, the first temperature value, and/or the flow rate value, and closing the valve corresponding to the coolant supply pipe that is determined to be abnormal; and determining if the coolant return pipe is abnormal according to the first temperature value and/or the second temperature value, and closing the valve corresponding to the coolant return pipe that is determined to be abnormal.

Accordingly, the method of operating the liquid-cooled charging equipment with multiple charging connector assemblies is provided to determine whether the pipe has abnormal coolant leakage or whether the charging connector as abnormal overheat by using the pressure sensor, the flow sensor, and the temperature sensor so that the relevant actions such as early warning, protection, and maintenance can be taken in time to increase the service life of charging connector assemblies and electric vehicles and ensure user safety. In addition, once one or some of the charging connector assemblies are disabled due to abnormal conditions, the rest normal charging connector assemblies can still continue to operate, which increases the availability and reliability of the liquid-cooled charging equipment.

Further another object of the present disclosure is to provide a method of operating a liquid-cooled charging equipment with multiple charging connector assemblies to solve the problems of the existing technology.

In order to achieve the above-mentioned object, the method of operating the liquid-cooled charging equipment with multiple charging connector assemblies includes steps of: turning on the valve corresponding to the charging connector when at least one of the charging connector assemblies charges, measuring a temperature value of the charging connector, and determining that the charging connector is abnormal according to the temperature value, and turning off the valve corresponding to the abnormal charging connector.

Accordingly, the method of operating the liquid-cooled charging equipment with multiple charging connector assemblies is provided to determine whether the pipe is in the coolant leakage or whether the charging connector is in the overheat by using the pressure sensor, the flow sensor, and the temperature sensor so that the early warning, protection, and maintenance can be taken in time to increase the service life of charging connector assemblies and electric vehicles and ensure the safety of users. In addition, once one or some of the charging connector assemblies are disabled due to abnormal conditions, other normal charging connector assemblies can still continue to operate to increase the availability and reliability of the liquid-cooled charging equipment.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
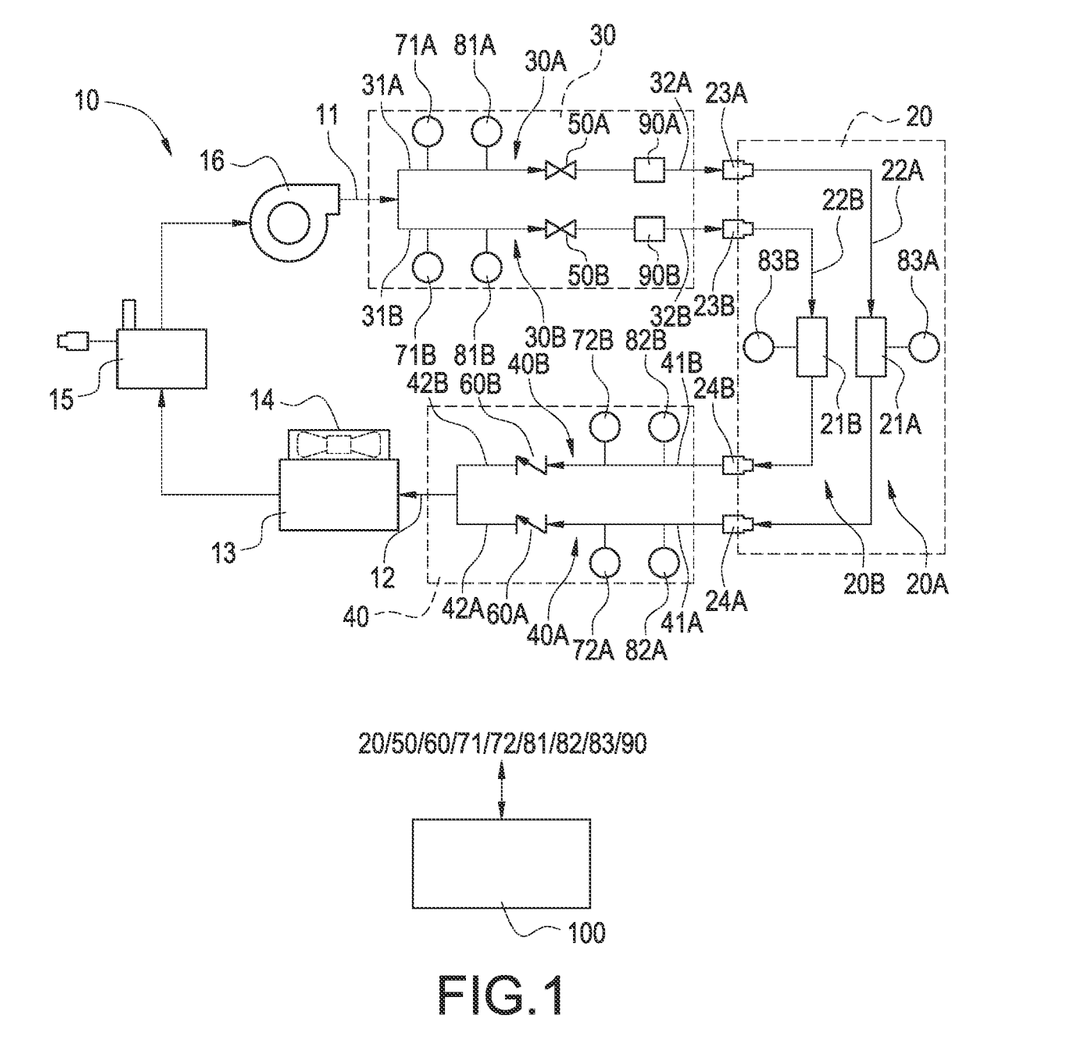
FIG. 1 is a schematic system diagram of a liquid-cooled charging equipment with multiple charging connector assemblies according to the present disclosure.

Please refer to FIG. 1, which shows a schematic system diagram of a liquid-cooled charging equipment with multiple charging connector assemblies according to the present disclosure. The liquid-cooled charging equipment with multiple charging connector assemblies includes a recirculating cooling apparatus 10, a plurality of charging connector assemblies 20, a plurality of coolant supply pipes 30, a plurality of coolant return pipes 40, a plurality of valves 50, and a control unit 100. Although the number of the plural charging connector assemblies 20 shown in FIG. 1 is two, in actual applications, it is not limited to two charging connector assemblies 20, for example, more than three charging connector assembly 20 may be used for charging at the same time. For explanation convenience, two charging connector assemblies 20 are taken as an example for description. Furthermore, the term "plural" mentioned above not only means that the number of such devices and components is multiple, but also means that the number is correspondingly equal. For example, if the number of the plurality of charging connector assemblies 20 is three, it means that the number of the plurality of coolant supply pipes 30, the plurality of coolant return pipes 40, and the plurality of valves 50 are all three, corresponding to each other.

As shown in FIG. 1, the recirculating cooling apparatus 10 has an outlet side 11 and an inlet side 12. The recirculating cooling apparatus 10 mainly includes a heat exchanger 13, a heat-dissipating fan 14, a liquid-storing tank 15, and a pump 16. The heat exchanger 13 cooperates with the heat-dissipating fan 14, and is connected to an output side of the coolant return pipe 40 for cooling the higher-temperature coolant flowing from the coolant return pipe 40 back to the recirculating cooling apparatus 10, and the cooled lower-temperature coolant flows back to the liquid-storing tank 15 for storage. The pump 16 is connected to an input side of the coolant supply pipe 30 for drawing and transporting the coolant during the circulating operation so that the lower-temperature coolant is sent to the coolant supply pipes 30 to cool the charging connector assemblies 20. In this embodiment, the coolant may be, for example but not limited to, the solution with conductivity of pure water plus ethylene glycol or the solution with conductivity of pure water plus propylene glycol, or it may be, for example but not limited to, oil without conductivity.

As shown in FIG. 1, the charging connector assemblies 20 includes a first charging connector assembly 20A and a second charging connector assembly 20B. The first charging connector assembly 20A has a charging connector 21A, and a charging cable 22A that is connected to the charging connector 21A and has an inlet end 23A and an outlet end 24A. Similarly, the second charging connector assembly 20B has a charging connector 21B, and a charging cable 22B that is connected to the charging connector 21B and has an inlet end 23B and an outlet end 24B. For the first charging connector assembly 20A, the inlet end 23A is an end where the coolant flows into the first charging connector assembly 20A, and the outlet end 24A is an end where the coolant flows out from the first charging connector assembly 20A. Therefore, the coolant flows into the first charging connector assembly 20A through the inlet end 23A and flows out from the first charging connector assembly 20A through the outlet end 24A to cool the charging connector 21A. The second charging connector assembly 20B has the same structure, so the detail is omitted here for conciseness.

A first end 31A of a first coolant supply pipe 30A corresponding to the first charging connector assembly 20A is connected to the outlet side 11 of the recirculating cooling apparatus 10, and a second end 32A of the first coolant supply pipe 30A is connected to the inlet end 23A of the first charging connector assembly 20A. The second coolant supply pipe 30B has the same structure, so the detail is omitted here for conciseness. In other words, as shown in FIG. 1, the first end 31A of the first coolant supply pipe 30A is connected with a first end 31B of a second coolant supply pipe 30B, and the first ends 31A and 31B are commonly connected to the outlet side 11 of the recirculating cooling apparatus 10. Further, the second end 32A of the first coolant supply pipe 30A is correspondingly connected to the inlet end 23A of the first charging connector assembly 20A, and a second end 32B of the second coolant supply pipe 30B is correspondingly connected to the inlet end 23B of the second charging connector assembly 20B.

A first end 41A of a first coolant return pipe 40A corresponding to the first charging connector assembly 20A is connected to the outlet end 24A of the first charging connector assembly 20A, and a second end 42A of the first coolant return pipe 40A is connected to the inlet side 12. The second coolant return pipe 40B has the same structure, so the detail is omitted here for conciseness. In other words, as shown in FIG. 1, the first end 41A of the first coolant return pipe 40A is correspondingly connected to the outlet end 24A of the first charging connector assembly 20A, and a first end 41B of the second coolant return pipe 40B is correspondingly connected to the outlet end 24B of the second charging connector assembly 20B. Further, the second end 42A of the first coolant return pipe 40A is connected with a second end 42B of a second coolant return pipe 40B, and the second ends 42A and 42B are commonly connected to the inlet side 12 of the recirculating cooling apparatus 10.

A plurality of valves 50 are correspondingly disposed in the coolant supply pipes 30, respectively. Specifically, the first coolant supply pipe 30A has a first valve 50A and the second coolant supply pipe 30B has a second valve 50B, and the first valve 50A and the second valve 50B are controlled to open or close so as to control whether the coolant flows through the first coolant supply pipe 30A and/or the second coolant supply pipe 30B. For example, assuming that there are three charging connector assemblies 20, including a first charging connector assembly 20A, a second charging connector assembly 20B, and a third charging connector assembly 20C, therefore there are three corresponding coolant supply pipes 30, including a first coolant supply pipe 30A, a second coolant supply pipe 30B, and a third coolant supply pipe 30C. Each of the three coolant supply pipes 30 has one valve 50, including a first valve 50A, a second valve 50B, and a third valve 50C. In another embodiment, the liquid-cooled charging equipment includes a switching unit. The switching unit is coupled to the control unit 100 and the valves 50, and the switching unit receives a valve control command provided from the control unit 100 to correspondingly control the valves to open on or close.

Therefore, when any one of the charging connector assemblies 20 is in operation of charging EV, the corresponding valve 50 is controlled so that the lower-temperature coolant from the outlet side 11 of the recirculating cooling apparatus 10 flows to the corresponding coolant supply pipe 30 to cool the corresponding charging connector assembly 20. For example, when the first charging connector assembly 20A, the second charging connector assembly 20B, and the third charging connector assembly 20C are in operation of charging and need to be cooled, the first valve 50A, the second valve 50B, and the third valve 50C may be opened so that the coolant from the recirculating cooling apparatus 10 flows to the first charging connector assembly 20A, the second charging connector assembly 20B, and the third charging connector assembly 20C through the first coolant supply pipe 30A, the second coolant supply pipe 30B, and the third coolant supply pipe 30C, respectively. When only the third charging connector assembly 20C needs to be cooled, the first valve 50A and the second valve 50B may be closed and the third valve 50C may be opened so that the coolant from the recirculating cooling apparatus 10 may only flow to the third charging connector assembly 20C through the third coolant supply pipe 30C, but does not flow to the first charging connector assembly 20A and the second charging connector assembly 20B through the first coolant supply pipe 30A and the second coolant supply pipe 30B, respectively. In particular, when the charging equipment operates, not all charging connector assemblies will be in operation at the same time, that is, only one charging connector assembly 20A is in operation or only two charging connector assemblies 20A, 20C are in operation. In this condition, the control unit 100 only needs to open the corresponding valve(s) for the charging connector assembly(s) that is (are) in operation and need(s) to be cooled. In particular, the valves 50 may be, but not limited to, arranged and integrated into one modular, or be separated into three different modules. As long as these valves 50 can achieve the function of controlling the flow of the coolant through the coolant supply pipes 30 or blocking the flow of the coolant through the coolant supply pipes 30, they should be included in the scope of the present disclosure.

In addition, the liquid-cooled charging equipment further includes a plurality of unidirectional valves 60. The plurality of unidirectional valves 60 are correspondingly disposed in the coolant return pipe 40, respectively, that is, the first coolant return pipe 40A has a first unidirectional valve 60A, the second coolant return pipe 40B has a second unidirectional valve 60B, and the third coolant return pipe 40C has a third unidirectional valve 60C. The unidirectional valve 60 is used to limit the flow direction of the coolant, so that the coolant can only flow from the second end 42 of the coolant return pipe 40 to the inlet side 12 of the recirculating cooling apparatus 10, preventing the coolant from flowing from the common connection point of the coolant return pipes 40 back to other charging connector assemblies, which may lead to abnormal heat dissipation. In one embodiment, the unidirectional valve 60 may be a check valve or similar components or devices that can achieve unidirectional (one-way) flow of the coolant.

For example, as mentioned above, when only the third charging connector assembly 20C needs to be cooled, the third valve 50C is opened so that the coolant from the recirculating cooling apparatus 10 may only flow to the third charging connector assembly 20C through the third coolant supply pipe 30C, without flowing to the first charging connector assembly 20A and the second charging connector assembly 20B through the first coolant supply pipe 30A and the second coolant supply pipe 30B, respectively. In addition, with the implementation of the unidirectional valves 60, the coolant flowing through the third charging connector assembly 20C flows through the third unidirectional valve 60C to the inlet side 12 of the recirculating cooling apparatus 10 via the second end of the third coolant return pipe 40C. Since the second end of the first coolant return pipe 40A, the second end of the second coolant return pipe 40B, and the second end of the third coolant return pipe 40C are connected together and commonly connected to the inlet side 12 of the recirculating cooling apparatus 10, without the unidirectional valves 60, even if there is no coolant flowing to the first charging connector assembly 20A and the second charging connector assembly 20B through the first coolant supply pipe 30A and the second coolant supply pipe 30B, the coolant flowing out from the third coolant return pipe 40C may still flow back to the first charging connector assembly 20A and the second charging connector assembly 20B through the first coolant return pipe 40A and the second coolant return pipe 40B. Therefore, the implementation of the first unidirectional valve 60A and the second unidirectional valve 60B may prevent the coolant from flowing back to the first charging connector assembly 20A and the second charging connector assembly 20B.

In one embodiment, the liquid-cooled charging equipment further includes a plurality of first pressure sensors 71 and a plurality of second pressure sensors 72. The plurality of first pressure sensors 71 are correspondingly disposed in the coolant supply pipes 30 respectively for measuring a first pressure value of the coolant supply pipe 30. The plurality of second pressure sensors 72 are correspondingly disposed in the coolant return pipes 40 respectively for measuring a second pressure value of the coolant return pipe 40. For example, assuming that there are three coolant supply pipes 30, there will be three first pressure sensors 71 (71A, 71B, 71C), which are respectively disposed in the first coolant supply pipe 30A, the second coolant supply pipe 30B, and the third coolant supply pipe 30C for measuring the first pressure value of each of the three coolant supply pipes 30. Similarly, assuming that there are three coolant return pipes 40, there will also be three second pressure sensors 72 (72A, 72B, 72C), which are respectively disposed in the first coolant return pipe 40A, the second coolant return pipe 40B, and the third coolant return pipe 40C for measuring the second pressure value of each of the three coolant return pipes 40.

In another embodiment, the liquid-cooled charging equipment further includes a plurality of first temperature sensors 81 and a plurality of second temperature sensors 82. The plurality of first temperature sensors 81 are correspondingly disposed in the coolant supply pipes 30 respectively for measuring a first temperature value of the coolant supply pipe 30. The plurality of second temperature sensors 82 are correspondingly disposed in the coolant return pipes 40 respectively for measuring a second temperature value of the coolant return pipe 40. For example, assuming that there are three coolant supply pipes 30, there will also be three first temperature sensors 81 (81A, 81B, 81C), which are respectively disposed in the first coolant supply pipe 30A, the second coolant supply pipe 30B, and the third coolant supply pipe 30C for measuring the first temperature value of each of the three coolant supply pipes 30. Similarly, assuming that there are three coolant return pipes 40, there will also be three second temperature sensors 82 (82A, 82B, 82C), which are respectively disposed in the first coolant return pipe 40A, the second coolant return pipe 40B, and the third coolant return pipe 40C for measuring the second temperature value of each of the three coolant return pipes 40.

In another embodiment, the liquid-cooled charging equipment further includes a plurality of third temperature sensors 83. The plurality of third temperature sensors 83 are correspondingly disposed in the charging connectors 21 respectively for measuring a third temperature value of the charging connector 21. In one embodiment, the third temperature sensor 83 may be a negative temperature coefficient resistor (NTC resistor), also referred to as "NTC thermistor". Therefore, with the thermal characteristic of the NTC that its resistance decreases as the temperature of the charging connector 21 increases, or its resistance increases as the temperature of the charging connector 21 decreases, the temperature change of the charging connector 21 can be detected.

In another embodiment, the liquid-cooled charging equipment further includes a plurality of flow sensors 90. The plurality of flow sensors 90 are correspondingly disposed in the coolant supply pipes 30 respectively for measuring a flow rate value of the coolant supply pipe 30. For example, assuming there are three coolant supply pipes 30, there will also be three flow sensors 90 (90A, 90B, 90C), which are respectively disposed in the first coolant supply pipe 30A, the second coolant supply pipe 30B, and the third coolant supply pipe 30C for measuring the flow rate value of each of three coolant supply pipes 30.

In the following, different operation scenarios will be explained with different diagrams. The liquid-cooled charging equipment with multiple charging connector assemblies of the present disclosure further includes a controller or a control unit. The controller or the control unit handles the functions such as comparison, processing or calculation of the data measured by the aforementioned sensors, as well as the communication with the controller of the electric vehicle.

Figure 2:
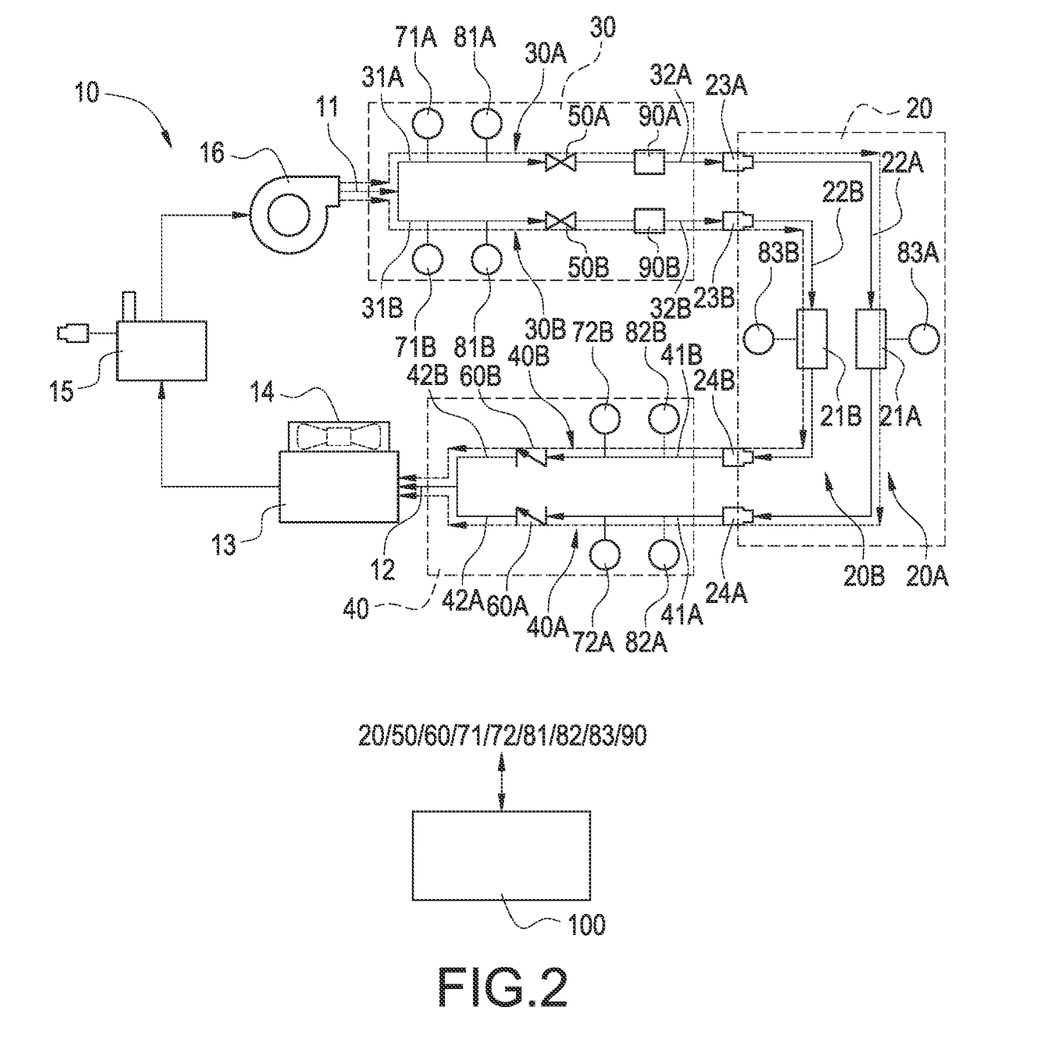
FIG. 2 is a schematic diagram of the liquid-cooled charging equipment with multiple charging connector assemblies operating in a normal condition according to a first embodiment of the present disclosure.

Please refer to FIG. 2, which shows a schematic diagram of the liquid-cooled charging equipment with multiple charging connector assemblies operating in a normal condition according to a first embodiment of the present disclosure. After the charging connector assembly of the liquid-cooled charging equipment is connected to the electric vehicle, the controller of the electric vehicle and the charging equipment communicate with each other through handshaking and have an agreement (coordination) between the charging demand and the power supply capacity of the charging equipment, and then the charging connector assembly is permitted to charge the electric vehicle. In this embodiment, the first charging connector assembly 20A and the second charging connector assembly 20B can normally provide electricity for the charging operation. Therefore, the first valve 50A of the first coolant supply pipe 30A and the second valve 50B of the second coolant supply pipe 30B are opened, so that the coolant from the recirculating cooling apparatus 10 is able to flow to the first charging connector 21A of the first charging connector assembly 20A through the first coolant supply pipe 30A, and to the second charging connector 21B of the second charging connector assembly 20B through the second coolant supply pipe 30B to cool the first charging connector 21A and the second charging connector 21B.

Take the first charging connector assembly 20A as an example. If the first pressure value of the first coolant supply pipe 30A measured by the first pressure sensor 71A and the second pressure value of the first coolant return pipe 40A measured by the second pressure sensor 72A are normal, the first temperature value of the first coolant supply pipe 30A measured by the first temperature sensor 81A and the second temperature value of the first coolant return pipe 40A measured by the second temperature sensor 82A are normal, the third temperature value of the first charging connector 21A measured by the third temperature sensor 83A is normal, and the flow rate value of the first coolant supply pipe 30A measured by the flow sensor 90A is normal, it can be determined that the cooling operation of the first charging connector assembly 20A is normal. Similarly, it is the same for the second charging connector assembly 20B. Therefore, the cooling operations of the first charging connector assembly 20A and the second charging connector assembly 20B shown in FIG. 2 are normal.

In particular, whether the pressure of the coolant supply pipe 30 and the coolant return pipe 40 are normal or not can be determined according to the first pressure value of the coolant supply pipe 30 and the second pressure value of the coolant return pipe 40 individually. That is, as long as one of the pressure values is greater than a predetermined pressure upper limit or less than a predetermined pressure lower limit, it can be determined that the pressure of the pipe is (abnormal) too high or too low. Or, it can be determined that the pressure of at least one of the coolant supply pipe 30 and the coolant return pipe 40 is too high or too low according to the difference between the first pressure value and the second pressure value being greater than a predetermined pressure difference limit.

Similarly, whether the temperature of the coolant supply pipe 30 and the coolant return pipe 40 are normal or not can be determined according to the first temperature value (lower-temperature) of the coolant supply pipe 30 and the second pressure value (higher-temperature) of the coolant return pipe 40 individually. For example, the first temperature value and the second temperature value can be compared with different predetermined temperature limits to determine whether the temperature of the coolant supply pipe 30 and/or the temperature of the coolant return pipe 40 is/are too high or not. Alternatively, it can be determined that the temperature of at least one of the coolant supply pipe 30 and the coolant return pipe 40 is too high according to a temperature difference between the first temperature value and the second temperature value being greater than a predetermined temperature difference limit.

Similarly, whether the temperature of the charging connector is normal or not may be determined according to the third temperature value. For example, when the third temperature value is greater than a temperature limit, it may be determined that the temperature of the charging connector is too high. In practical applications, different relevant actions such as early warning and protection mechanisms can also be performed according to the over-temperature condition. For example, when the third temperature value, namely a temperature of the body of the charging connector, is higher than a first temperature limit, for example 70 degrees Celsius, not yet reaching the temperature required to disable the charging operation of the charging connector assembly, for example 85 degrees Celsius, the controller or the control unit may only send out early warning signals as a notification and reference to the backend monitoring operators, so that the operators can continuously pay attention to this early warning and take preventive actions if necessary. When the third temperature value is higher than a second temperature limit, for example 85 degrees Celsius, the controller or the control unit disables the charging operation of the charging connector assembly to increase the service life of the charging connector assembly and the electric vehicle and ensure the user safety.

Similarly, whether the flow rate of the flow sensor 90 is normal or not can be determined according to the flow rate value. For example, when the flow rate value is greater than a flow rate upper limit or less than a flow rate lower limit, it may be determined that the flow rate of the coolant supply pipe 30 is too high or too low.

Figure 3:
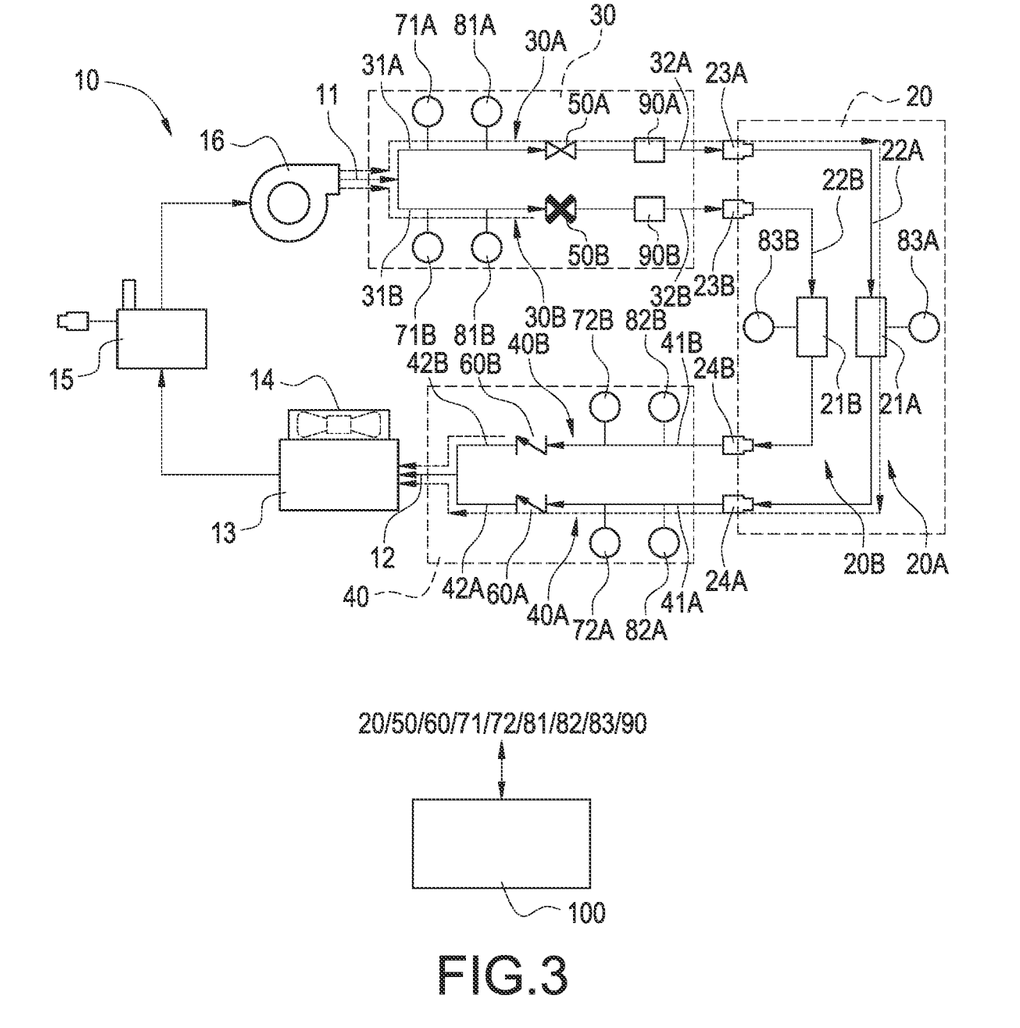
FIG. 3 is a schematic diagram of the liquid-cooled charging equipment with multiple charging connector assemblies operating in a normal condition according to a second embodiment of the present disclosure.

Please refer to FIG. 3, which shows a schematic diagram of the liquid-cooled charging equipment with multiple charging connector assemblies operating in a normal condition according to a second embodiment of the present disclosure. In this embodiment, one of the two charging connectors (for example the first charging connector) is in a charging operation and the other charging connector (for example the second charging connector) is in an idle state. Since the first charging connector is normal in the charging operation, the first valve 50A corresponding to the first charging connector assembly 20A is opened. Therefore, the coolant from the recirculating cooling apparatus 10 flows to the first charging connector assembly 20A through the first coolant supply pipe 30A to cool the first charging connector assembly 20A. Also, the higher-temperature coolant that flows back to the recirculating cooling apparatus 10 through the first coolant return pipe 40A is cooled by the heat exchanger 13 cooperating with the heat-dissipating fan 14 for recycle and reuse purposes. In addition, since the second charging connector assembly 20B is in the idle state, the second valve 50B corresponding to the second charging connector assembly 20B is closed. Therefore, the coolant does not flow through the second coolant supply pipe 30B and does not cool the second charging connector assembly 20B. As mentioned above, with the implementation of the unidirectional valve 60, it is possible to prevent the coolant from flowing back to the second charging connector assembly 20B.

Figure 4:
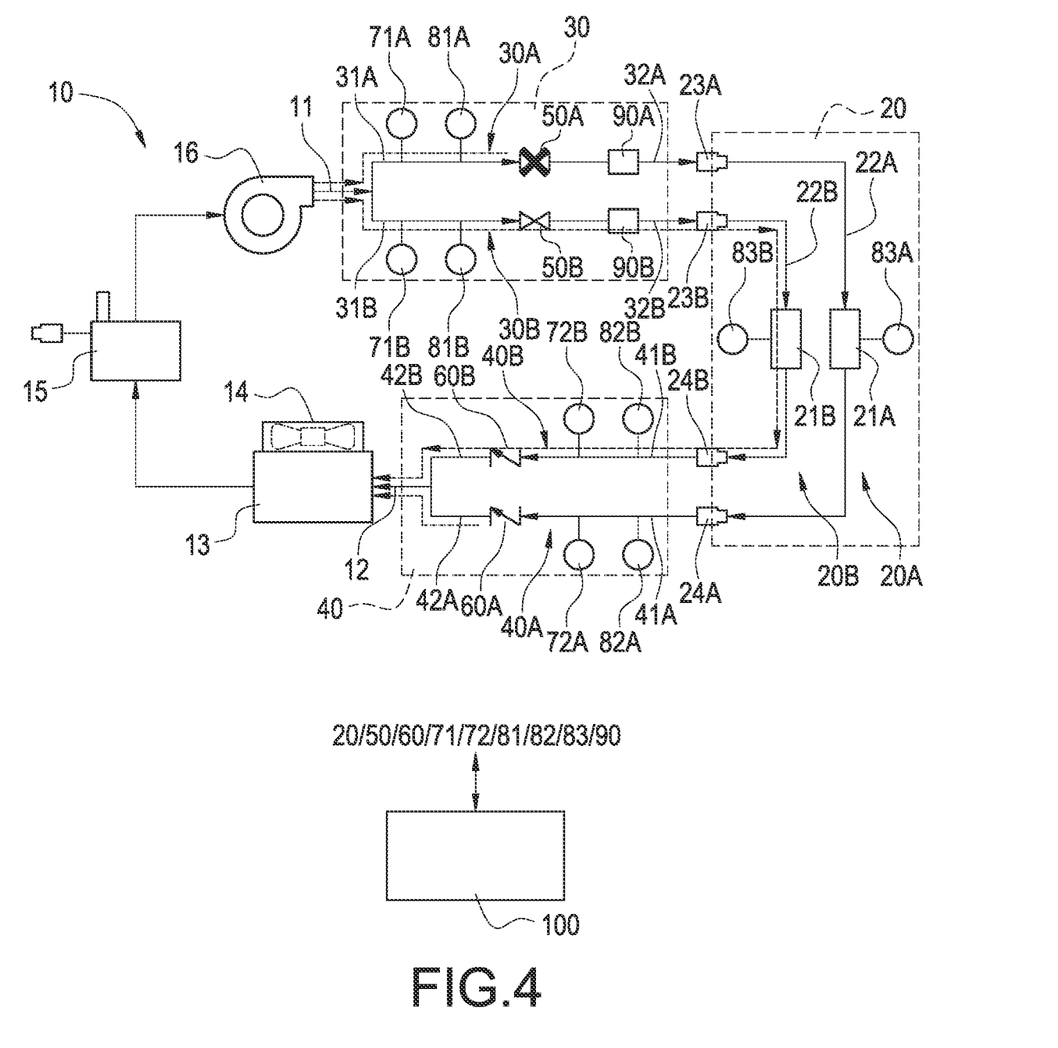
FIG. 4 is a schematic diagram of the liquid-cooled charging equipment with multiple charging connector assemblies operating in an abnormal condition according to a first embodiment of the present disclosure.

Please refer to FIG. 4, which shows a schematic diagram of the liquid-cooled charging equipment with multiple charging connector assemblies operating in an abnormal condition according to a first embodiment of the present disclosure. In this embodiment, a pipe, such as the first coolant supply pipe 30A corresponding to one of the two charging connectors (for example the first charging connector) is in an abnormal condition of coolant leakage. In this abnormal condition, since the first pressure value measured by the first pressure sensor 71A of the first coolant supply pipe 30A is lower than a pressure lower limit, it can be determined that the abnormal condition of coolant leakage of the first coolant supply pipe 30A occurs. Alternatively, when the flow rate value measured by the flow sensor 90A of the first coolant supply pipe 30A is lower than a flow rate lower limit, it can be also determined that the abnormal condition of coolant leakage of the first coolant supply pipe 30A occurs. In addition, if the abnormal condition of coolant leakage of the first coolant supply pipe 40A occurs, the second pressure value measured by the second pressure sensor 72A can also be used to determine the abnormal condition, so the detail is omitted here for conciseness.

Figure 5:
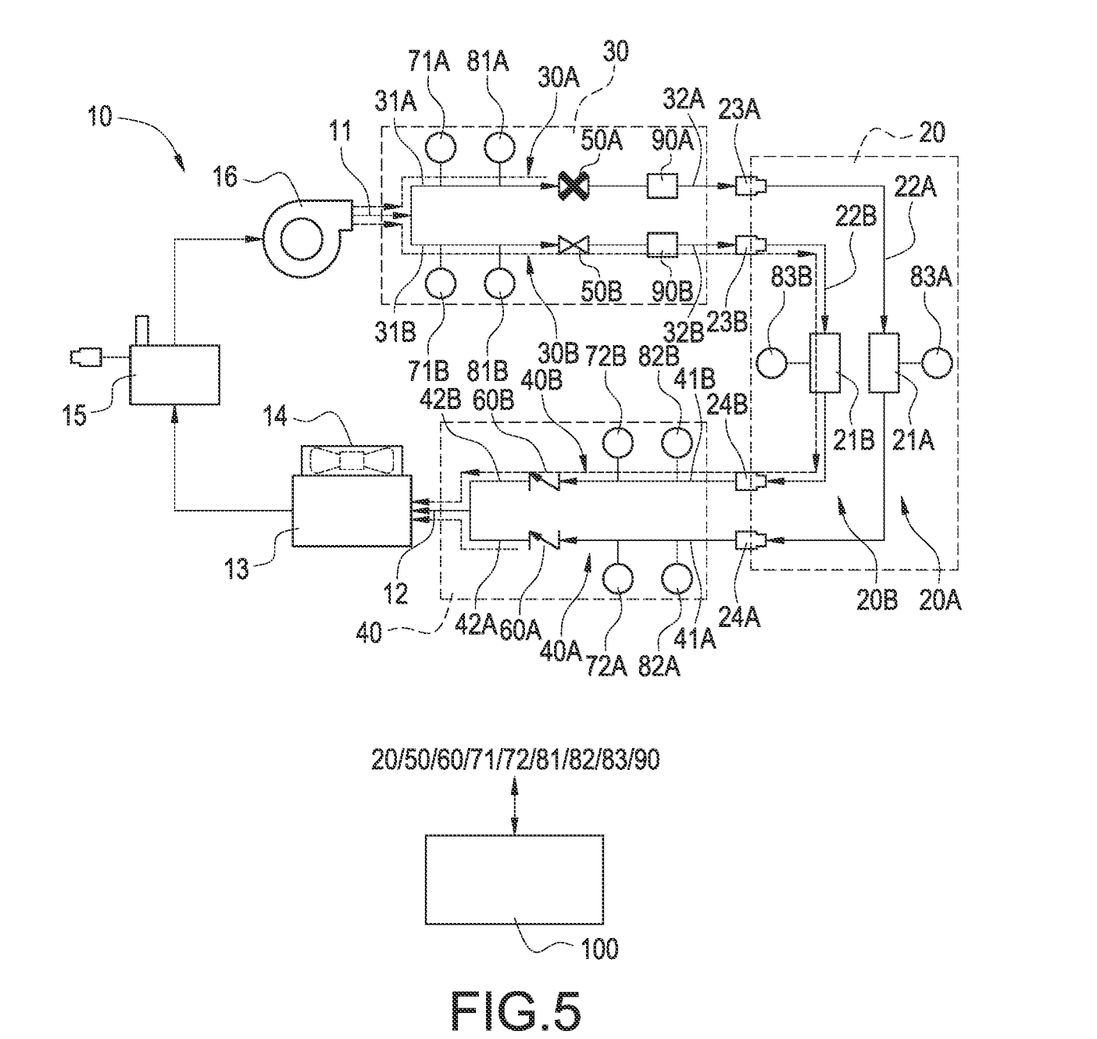
FIG. 5 is a schematic diagram of the liquid-cooled charging equipment with multiple charging connector assemblies operating in an abnormal condition according to a second embodiment of the present disclosure.

Please refer to FIG. 5, which shows a schematic diagram of the liquid-cooled charging equipment with multiple charging connector assemblies operating in an abnormal condition according to a second embodiment of the present disclosure. In this embodiment, one of the two charging connectors (for example the first charging connector) is in an abnormal condition of overheat. In this abnormal condition, since the third temperature value measured by the third temperature sensor 83A of the first charging connector assembly 20A is higher than a temperature upper limit, it can be determined that the abnormal condition of overheat of the first charging connector 21A occurs. Alternatively, when a temperature difference between the first temperature value measured by the first temperature sensor 81A of the first coolant supply pipe 30A and the second temperature value measured by the second temperature sensor 82A of the first coolant return pipe 40A is higher than a temperature difference limit, it can be determined that the abnormal condition of overheat of the first charging connector 21A occurs.

Figure 6:
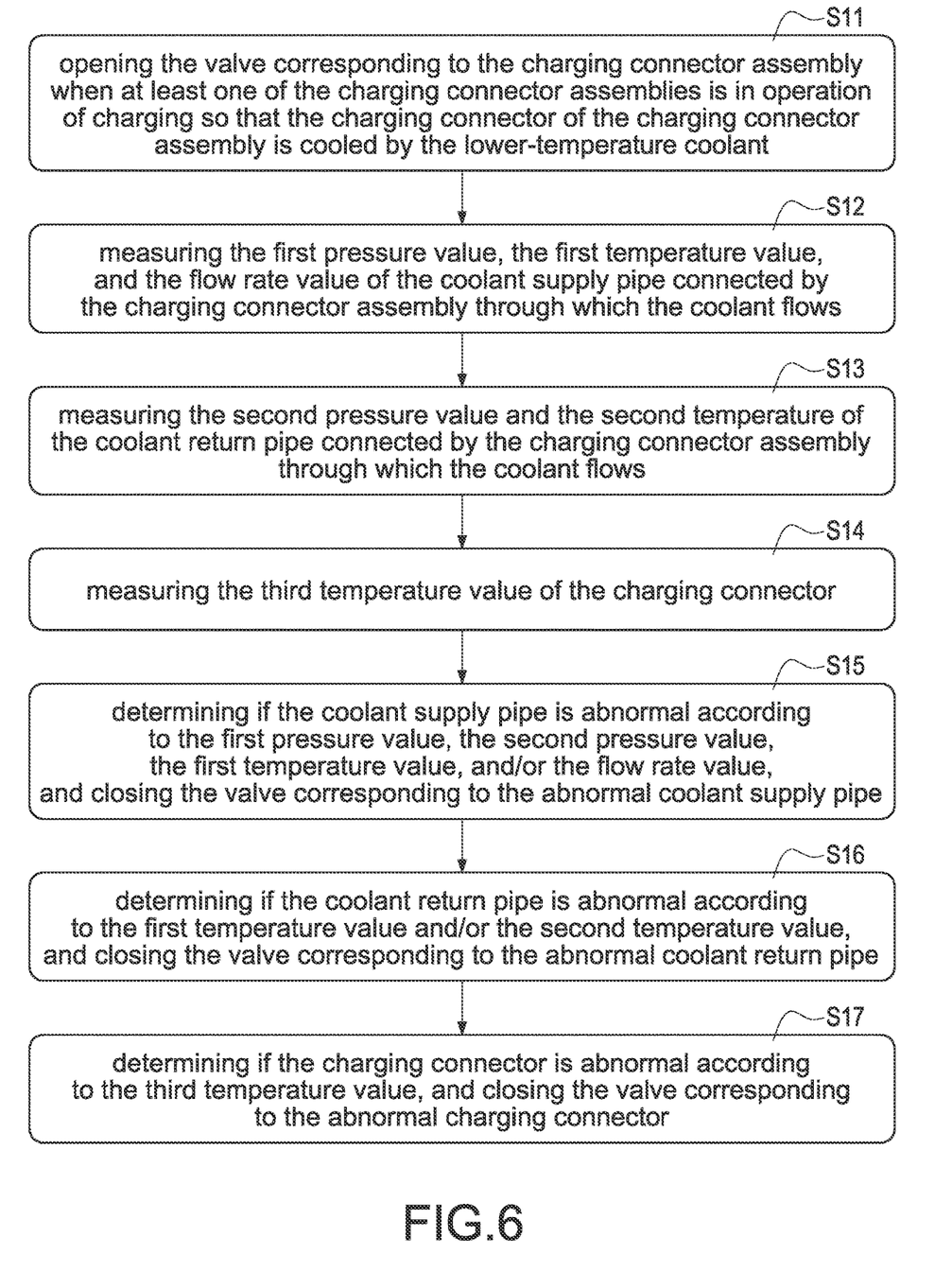
FIG. 6 is a flowchart of a method of operating the liquid-cooled charging equipment with multiple charging connector assemblies according to the present disclosure.

Please refer to FIG. 6, which shows a flowchart of a method of operating the liquid-cooled charging equipment with multiple charging connector assemblies according to the present disclosure. The method of operating the liquid-cooled charging equipment with multiple charging connector assemblies includes the following steps as follows. Opening the valve corresponding to the charging connector assembly when at least one of the charging connector assemblies is in operation of charging so that the charging connector of the charging connector assembly is cooled by the lower-temperature coolant (S11). Measuring the first pressure value, the first temperature value, and the flow rate value of the coolant supply pipe connected by the charging connector assembly through which the coolant flows (S12). Measuring the second pressure value and the second temperature of the coolant return pipe connected by the charging connector assembly through which the coolant flows (S13). Measuring the third temperature value of the charging connector (S14). Determining if the coolant supply pipe is abnormal (for example, the abnormal condition of coolant leakage) according to the first pressure value, the second pressure value, the first temperature value, and/or the flow rate value, and closing the valve corresponding to the abnormal coolant supply pipe (S15). Determining if the coolant return pipe is abnormal (for example, the abnormal condition of overheat) according to the first temperature value and/or the second temperature value, and closing the valve corresponding to the abnormal coolant return pipe (S16). Determining if the charging connector is abnormal (for example, the abnormal condition of overheat) according to the third temperature value, and closing the valve corresponding to the abnormal charging connector (S17).

Incidentally, the above-mentioned sequence of measuring temperature values and pressure values and sequence of closing the valves are not limited to the present disclosure. Therefore, the liquid-cooled charging equipment with multiple charging connector assemblies can provide early warning and close the corresponding valve for the abnormal pipes and/or charging connectors in time by determining whether the pipe is in the abnormal condition of coolant leakage or overheat according to the results measured by the pressure sensors, the flow sensors, and the temperature sensors, thereby increasing the service life of charging connector assemblies and electric vehicles and ensure user safety, keeping other normal charging connector assemblies operating, and enhancing the usability and reliability of the liquid-cooled charging equipment with multiple charging connector assemblies.

In summary, the present disclosure has the following features and advantages.

1. By individually opening or closing the valve disposed in each coolant supply pipe, the coolant can be controlled to flow through the pipes corresponding to the charging connectors that needs to be cooled.

2. By using the unidirectional valve, the coolant can be prevented from flowing back to the pipe corresponding and to the charging connector assembly that does not need to be cooled.

3. By using the pressure sensor, the flow sensor, and the temperature sensor, it can be determined whether the coolant leakage of the pipe occurs and/or whether the overheat of the charging connector occurs so that the early warning, protection, and maintenance can be taken in time to increase the service life of charging connector assemblies and electric vehicles and ensure user safety.

4. The normal charging connector assemblies will not be affected by the abnormality of other charging connector assemblies during operation, which can increase the usability and reliability of the liquid-cooled charging equipment.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A liquid-cooled charging equipment with multiple charging connector assemblies, comprising:
   a recirculating cooling apparatus configured to provide a coolant, the recirculating cooling apparatus having an outlet side and an inlet side,
   a plurality of charging connector assemblies, each charging connector assembly comprising a charging connector and a charging cable connected to the charging connector, the charging cable having an inlet end and an outlet end,
   a plurality of coolant supply pipes, a first end of each coolant supply pipe being connected to the outlet side, a second end of each coolant supply pipe correspondingly being connected to the inlet end of each charging cable,
   a plurality of coolant return pipes, a first end of each coolant return pipe correspondingly being connected to the outlet end of each charging cable, a second end of each coolant return pipe being connected to the inlet side,
   a plurality of valves disposed in the plurality of coolant supply pipes respectively, and
   a control unit coupled to the valves and the charging connector assemblies,
   wherein when at least one of the charging connector assemblies is in operation of charging, the control unit opens the valve corresponding to the charging connector assembly.

2. The liquid-cooled charging equipment of claim 1, further comprising:
   a plurality of unidirectional valves disposed in the plurality of coolant return pipes respectively.

3. The liquid-cooled charging equipment of claim 2, further comprising:
   a plurality of first pressure sensors coupled to the control unit and disposed in the plurality of coolant supply pipes respectively, each first pressure sensor being configured to measure a first pressure value of each coolant supply pipe and provide the first pressure value to the control unit, and
   a plurality of second pressure sensors coupled to the control unit and disposed in the plurality of coolant return pipes respectively, each second pressure sensor being configured to measure a second pressure value of each coolant return pipe and provide the second pressure value to the control unit.

4. The liquid-cooled charging equipment of claim 2, further comprising:

a plurality of first temperature sensors coupled to the control unit and disposed in the plurality of coolant supply pipes respectively, each first temperature sensor being configured to measure a first temperature value of each coolant supply pipe and provide the first temperature value to the control unit, and a plurality of second temperature sensors coupled to the control unit and disposed in the plurality of coolant return pipes respectively, each second temperature sensor being configured to measure a second temperature value of each coolant return pipe and provide the second temperature value to the control unit.

5. The liquid-cooled charging equipment of claim 2, further comprising:
a plurality of flow sensors coupled to the control unit and disposed in the plurality of coolant supply pipes respectively, each flow sensor being configured to measure a flow rate value of each coolant supply pipe and provide the flow rate value to the control unit.

6. The liquid-cooled charging equipment of claim 2, further comprising:
a plurality of third temperature sensors coupled to the control unit and disposed in the charging connectors respectively, and configured to measure a third temperature value of each charging connector and provide the third temperature value to the control unit.

7. The liquid-cooled charging equipment of claim 3, wherein if the control unit determines that the first pressure value is less than a first pressure lower limit, the control unit determines that the coolant supply pipe is abnormal, and if the control unit determines that the second pressure value is less than a second pressure lower limit, the control unit determines that the coolant return pipe is abnormal; the control unit closes the valve corresponding to the coolant supply pipe which is determined to be abnormal or the valve corresponding to the coolant return pipe which is determined to be abnormal.

8. The liquid-cooled charging equipment o claim 3, wherein if the control unit determines that a pressure difference between the first pressure value and the second pressure value is greater than a pressure difference limit, the control unit determines that the coolant supply pipe or the coolant return pipe is abnormal; the control unit closes the valve corresponding to the coolant supply pipe that is determined to be abnormal or the valve corresponding to the coolant return pipe that is determined to be abnormal.

9. The liquid-cooled charging equipment of claim 4, wherein if the control unit determines that the first temperature value is greater than a first temperature upper limit, the control unit determines that the coolant supply pipe is abnormal; when the control unit determines that the second temperature value is greater than a second temperature upper limit, the control unit determines that the charging connector is abnormal; the control unit closes the valve corresponding to the coolant supply pipe that is determined to be abnormal or the valve corresponding to the charging connector that is determined to be abnormal.

10. The liquid-cooled charging equipment of claim 4, wherein if the control unit determines that a temperature difference between the first temperature value and the second temperature value is greater than a temperature difference limit, the control unit determines that the charging connector is abnormal; the control unit closes the valve corresponding to the charging connector that is determined to be abnormal.

11. The liquid-cooled charging equipment of claim 5, wherein if the control unit determines that the flow rate value is less than a flow rate lower limit, the control unit determines that the coolant supply pipe is abnormal; the control unit closes the valve corresponding to the coolant supply pipe that is determined to be abnormal.

12. The liquid-cooled charging equipment of claim 6, if the control unit determines that the third temperature value is greater than a third temperature upper limit, the control unit determines that the charging connector is abnormal; the control unit closes the valve corresponding to the charging connector that is determined to be abnormal.

13. The liquid-cooled charging equipment of claim 1, further comprising:
a switching unit coupled to the control unit and the valves, the switching unit configured to receive a valve control command provided from the control unit to open or close the valves.

14. The liquid-cooled charging equipment of claim 1, wherein the valves are arranged as one module or separated into different modules.

15. The liquid-cooled charging equipment of claim 2, wherein each unidirectional valve is a check valve.

16. The liquid-cooled charging equipment of claim 6, wherein each third temperature sensor is a negative temperature coefficient resistor.

* * * * *